(12) United States Patent
Brown et al.

(10) Patent No.: US 9,755,986 B1
(45) Date of Patent: Sep. 5, 2017

(54) TECHNIQUES FOR TIGHTLY-INTEGRATING AN ENTERPRISE STORAGE ARRAY INTO A DISTRIBUTED VIRTUALIZED COMPUTING ENVIRONMENT

(71) Applicant: EMC Corporation, Hopkinton, MA (US)

(72) Inventors: Jeffrey Alan Brown, Shrewsbury, MA (US); Mark A. Parenti, Milford, NH (US); Kenneth Charles Hill, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 509 days.

(21) Appl. No.: 14/135,046

(22) Filed: Dec. 19, 2013

(51) Int. Cl.
*G06F 15/173* (2006.01)
*H04L 12/911* (2013.01)

(52) U.S. Cl.
CPC .................. *H04L 47/70* (2013.01)

(58) Field of Classification Search
CPC ...................................... H04L 47/70
See application file for complete search history.

(56) References Cited

U.S. PATENT DOCUMENTS

| | | | |
|---|---|---|---|
| 6,941,396 B1 * | 9/2005 | Thorpe .................. | G06F 13/12 710/74 |
| 7,216,195 B1 | 5/2007 | Brown et al. | |
| 8,996,671 B1 * | 3/2015 | Horan .................. | H04L 12/569 709/223 |
| 9,152,578 B1 | 10/2015 | Saad et al. | |
| 2009/0327600 A1 * | 12/2009 | Yarnell ............... | G06F 12/0815 711/113 |

(Continued)

OTHER PUBLICATIONS

Kenneth Hui; "Laying Cinder Block (Volumes) in OpenStack, Part 1: The Basics"; Musings on Cloud Computing and IT-as-a-Service; Nov. 18, 2013; downloaded from http://cloudarchitectmusings.com/2013/11/18/laying-cinder-block-volumes-in-openstack-part-1-the-basics/ on Dec. 10, 2013; 10 pages.

(Continued)

*Primary Examiner* — Nicholas Taylor
*Assistant Examiner* — Tania Pena-Santana
(74) *Attorney, Agent, or Firm* — BainwoodHuang

(57) ABSTRACT

Techniques are directed to a cloud-integrated enterprise-class data storage array. It includes (a) an enclosure, (b) a set of storage drives mounted in the enclosure, (c) network interface circuitry mounted in the enclosure, the network interface circuitry communicatively connecting the cloud-integrated enterprise-class data storage array to a network to form a distributed virtualized computing environment, and (d) a redundant set of storage processors mounted in the enclosure. The redundant set of storage processors are configured to (1) process data storage operations directed at the set of storage drives in a highly-available and deterministic manner and (2) operate a cloud storage management node of the distributed virtualized computing environment to manage assignment of logical disks to respective virtual machines of the distributed virtualized computing environment, the logical disks including storage from the set of storage drives. A method and computer program product are also provided.

10 Claims, 3 Drawing Sheets

(56) References Cited

U.S. PATENT DOCUMENTS

| | | | | |
|---|---|---|---|---|
| 2011/0145818 A1* | 6/2011 | Vemuri | ............ | G06F 9/455 |
| | | | | 718/1 |
| 2012/0047339 A1* | 2/2012 | Decasper | ............ | G06F 11/1076 |
| | | | | 711/162 |
| 2012/0221683 A1* | 8/2012 | Ferris | ............ | G06F 15/16 |
| | | | | 709/218 |
| 2014/0330948 A1* | 11/2014 | Dunn | ............ | H04L 41/0813 |
| | | | | 709/221 |
| 2015/0127834 A1* | 5/2015 | Udupi | ............ | H04L 47/78 |
| | | | | 709/237 |

OTHER PUBLICATIONS

"OpenStack"; Wikipedia; downloaded from http://en.wikipedia.org/wiki/OpenStack on Nov. 6, 2013; pp. 1-8.

"Ceph (storage)"; Wikipedia; downloaded from http://en.wikipedia.org/wiki/Ceph_(storage) on Dec. 5, 2013; 6 pages.

Avishay Traeger; "OpenStack Cinder Overview—Havana Release"; downloaded from http://www.slideshare.net/avishaytraeger/cinder-havana on Dec. 10, 2013; pp. 4-7.

* cited by examiner

110
Operate as a storage management node of the distributed virtualized computing environment to assign a logical disk to a virtual machine of the distributed virtualized computing environment, the logical disk including storage from a set of storage drives of the enterprise-class data storage array

112
Receive a request from a storage scheduling node of the distributed virtualized computing environment to allocate a virtual disk to a particular VM of the distributed virtualized computing environment from the set of storage drives

114
Request allocation of a partition from the set of storage drives

116
Upon receiving notice of allocation of the requested partition, communicate with the particular node of the of the distributed virtualized computing environment to establish an assignment of the requested partition to the particular VM of the distributed virtualized computing environment as the virtual disk

120
Process data storage operations directed at the logical disk from the set of storage devices in a highly-available and deterministic manner

TECHNIQUES FOR TIGHTLY-INTEGRATING AN ENTERPRISE STORAGE ARRAY INTO A DISTRIBUTED VIRTUALIZED COMPUTING ENVIRONMENT

BACKGROUND

Cloud computing is a term that has recently been used to refer to using distributed virtualized computing environments to provide services remotely over the Internet in a distributed manner. In order to easily deal with dynamic demand patterns, the services are deployed in a virtualized manner across several servers, allowing nodes of each service to execute on any one of the several servers as utilization allows. These servers are typically commodity off-the-shelf (COTS) servers, available in bulk at commodity prices.

One example architecture for a distributed virtualized computing environment is the OpenStack architecture, which operates Nova compute nodes, Neutron networking nodes, Swift object storage nodes, and Cinder block storage nodes (as well as several other kinds of nodes) to effectively provide cloud services. A Cinder block storage node typically provides virtualized storage to the other nodes using local storage available on the COTS server on which the Cinder block storage node is running. This virtualized storage beneficially allows cloud services to access storage that persists across instantiation of the service on different COTS servers.

SUMMARY

Unfortunately, the above-described management applications may suffer from deficiencies. For example, certain kinds of applications may require highly-available and deterministically-performing storage that is not available on a COTS server, but rather can be provided by an Enterprise-class data storage array. In order to run these applications in the cloud using virtualized storage, Enterprise-class data storage must be made available to the distributed virtualized computing environment. This may be accomplished by running a Cinder block storage node on a COTS server that connects over a connection to an Enterprise-class storage array, a plugin module allowing the Cinder block storage node to serve as a front-end to a back-end Enterprise-class storage array by communicating cloud storage management information with the Enterprise-class storage array over the connection. However, this technique is suboptimal because the cloud storage management commands must go through an extra layer of communication before reaching the Enterprise-class storage array, increasing the latency of storage management operations, thereby slowing down the instantiation of cloud services that utilize virtualized storage.

In order to alleviate these problems, it would be desirable to tightly-integrate an Enterprise-class storage array into a distributed virtualized computing environment, such as an OpenStack environment, to allow highly-available and deterministically-performing virtualized storage to be made available to cloud services without the increased latency associated with accessing a back-end Enterprise-class storage array via an extra front-end OpenStack node over an extra network hop. In contrast to the above-described approaches, improved techniques are described for placing an Enterprise-class storage array directly into the distributed virtualized computing environment and running a cloud storage management node (as well as other cloud services) directly within the Enterprise-class storage array. This approach is also beneficial in that it reduces the complexity of installing and maintaining an Enterprise-class storage array into a distributed virtualized computing environment.

One embodiment of the improved techniques is directed to a cloud-integrated enterprise-class data storage array. The cloud-integrated enterprise-class data storage array includes (a) an enclosure, (b) a set of storage drives mounted in the enclosure, (c) network interface circuitry mounted in the enclosure, the network interface circuitry communicatively connecting the cloud-integrated enterprise-class data storage array to a network to form a distributed virtualized computing environment, and (d) a redundant set of storage processors mounted in the enclosure. The redundant set of storage processors are configured to (1) process data storage operations directed at the set of storage drives in a highly-available and deterministic manner and (2) operate a cloud storage management node of the distributed virtualized computing environment to manage assignment of logical disks to respective virtual machines of the distributed virtualized computing environment, the logical disks including storage from the set of storage drives. Other embodiments are directed to a method and computer program product to be used in the context of the cloud-integrated enterprise-class data storage array.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 depicts an example method according to various embodiments.

DETAILED DESCRIPTION

Embodiments are directed to techniques for placing an Enterprise-class storage array directly into a distributed virtualized computing environment and running a cloud storage management node (as well as other cloud services) directly within the Enterprise-class storage array.

Figure 1:
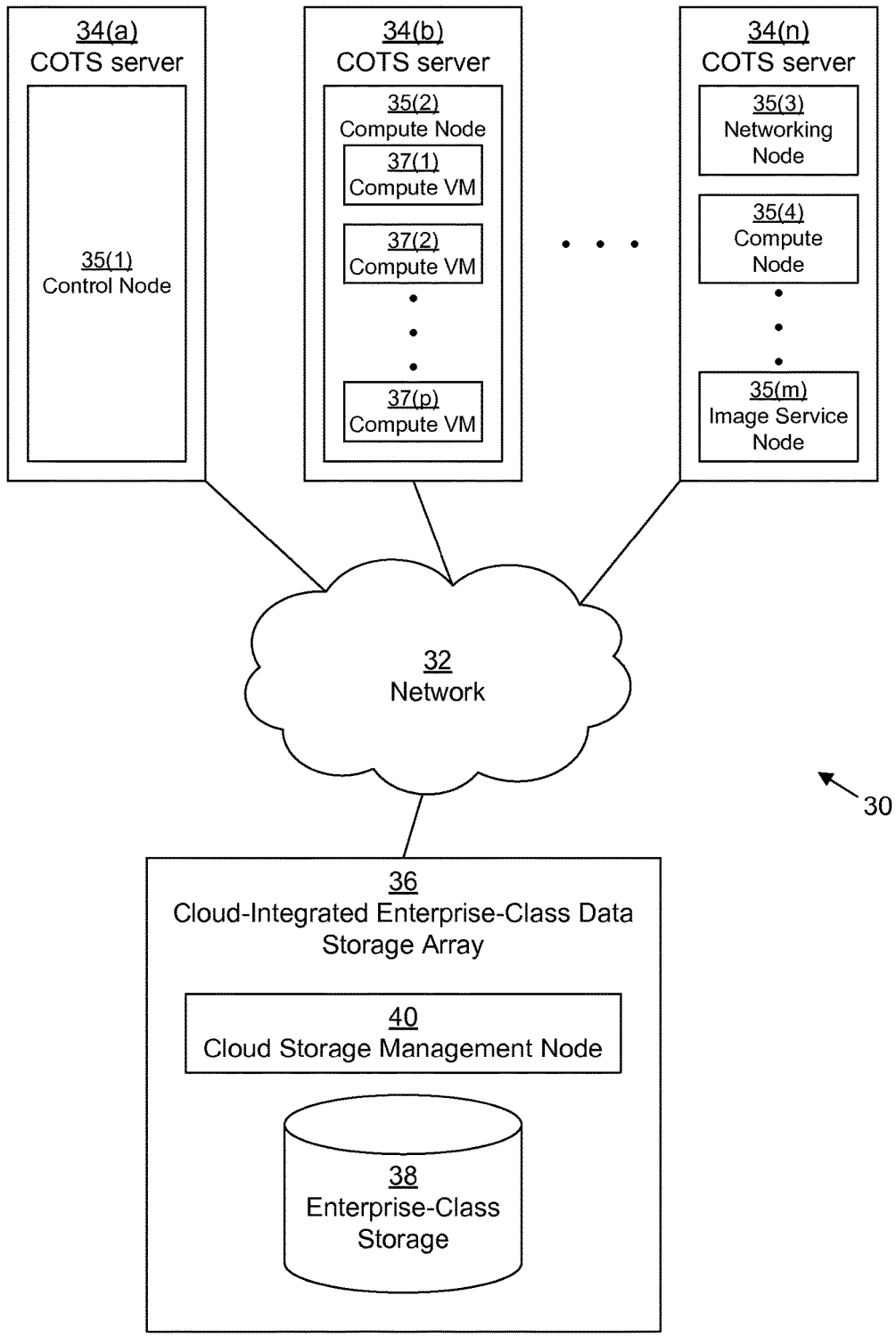
FIG. 1 depicts an example system for use in conjunction with various embodiments.

FIG. 1 depicts an example distributed virtualized computing environment (DVCE) 30. DVCE 30 includes a set of commodity off-the-shelf (COTS) servers 34 (depicted as COTS servers 34(a), 34(b), . . . , 34(n)) that connect to each other and a cloud-integrated Enterprise-class data storage array 36 via network 32.

Network 32 may be any kind of data communication network, such as for example the Internet, a local area network (LAN), a wide area network (WAN), a storage area network (SAN), a virtual private network (VPN), a cellular data network, a wireless local area network, an interconnected fabric of connections and switches, similar systems, and combinations thereof. In some embodiments, two or more separate networks 32 may connect components 34, 36 together in parallel, such as, for example, one Ethernet-based LAN and one fiber channel-based SAN, the SAN being used for data storage transfers.

Each COTS server 34 is a computing device, such as, for example, a personal computer, a workstation computer, a server computer, a tablet, a laptop computer, etc. Typically, each COTS server 34 is a server computer having a processor, memory, a network connection for connecting to network 32, and a small amount of local storage for local use (e.g., fewer than 25 disks). Each COTS server 34 typically operates as one or more nodes 35 (depicted as nodes 35(1), 35(2), 35(3), 35(4), . . . , 35(m)) of the DVCE 30 (also known as cloud nodes), such as, for example OPEN-STACK® nodes, in accordance with OPENSTACK standards as promulgated by the OPENSTACK Foundation on the website at docs.openstack.org as of the date of this filing. The particular virtualized nodes 35 in operation may vary based on the cloud computing needs of the system, but typically there is at least one control node 35(1) (e.g., a specialized OPENSTACK Nova node that is configured to perform various control functions for the DVCE 30) and one networking node 35(3) (e.g., an OPENSTACK Neutron node) in operation. In a typical configuration (not depicted), at least three control nodes are in operation at any time, being able to control on the order of one hundred nodes 35. One or more compute nodes 35(2), 35(4) (e.g., OPEN-STACK Nova nodes) are also typically present. In some arrangements, additional nodes 35 such as, for example image service node 35(m) (e.g., an OPENSTACK Glance node) may also be present and executing on one or more of the COTS servers 34. In a typical implementation, some of the nodes 35 provide hypervisors that allow virtual machine instances to be instantiated as needed within one or more Kernel-based Virtual Machine hypervisors (KVMs) (not depicted). For example, as depicted, compute node 35(2) is running a set of p compute virtual machines (VMs) 37 (depicted as compute VMs 37(1), 37(2), . . . , 37(p)), some of which may be configured to provide user services via the cloud.

In order to provide cloud storage services to the DVCE 30, one or more cloud block storage nodes (e.g., OpenStack CINDER™ nodes) may be used. CINDER typically includes multiple subcomponents, for example, one CINDER scheduler node and one or more CINDER volume manager node. One or more of these CINDER subcomponents will run on the cloud-integrated Enterprise-class data storage array 36. As depicted, cloud storage management node 40 (e.g., an OpenStack CINDER volume manager node) executes on the cloud-integrated Enterprise-class data storage array 36, which effectively places the cloud-integrated Enterprise-class data storage array 36 within the DVCE 30. This is because an OpenStack node 35 (or at least a subcomponent of a node 35) is now running on the cloud-integrated Enterprise-class data storage array 36.

Cloud-integrated Enterprise-class data storage array 36 may be, for example, a high performance data storage array, such as, for example a VNXe Series data storage system produced by the EMC Corp. of Hopkinton, Mass. The cloud-integrated Enterprise-class data storage array 36 provides highly-available and deterministic Enterprise-class data storage 38 to the COTS servers 34 via network 32. Storage services are considered highly-available if they are engineered to provide five nines of availability, as is well-understood in the art. For example, the system should not experience more than 5.26 minutes of downtime per year, on average. Storage services are considered deterministic if they are designed to provide responses within an established period of time (e.g., 10 milliseconds for a simple I/O) rather than according to a best efforts approach.

In order to provide virtualization services, cloud storage management node 40, executing on the cloud-integrated Enterprise-class data storage array 36, provides cloud storage management features to the other nodes 35. Thus, for example, cloud-integrated Enterprise-class data storage array 36 interfaces with local storage software of the cloud-integrated Enterprise-class data storage array 36 in order to dynamically allocate, reallocate, and de-allocate storage partitions and assign those partitions to particular respective nodes 35. Additional detail with respect to the cloud-integrated Enterprise-class data storage array 36 is provided in connection with FIG. 2.

Figure 2:
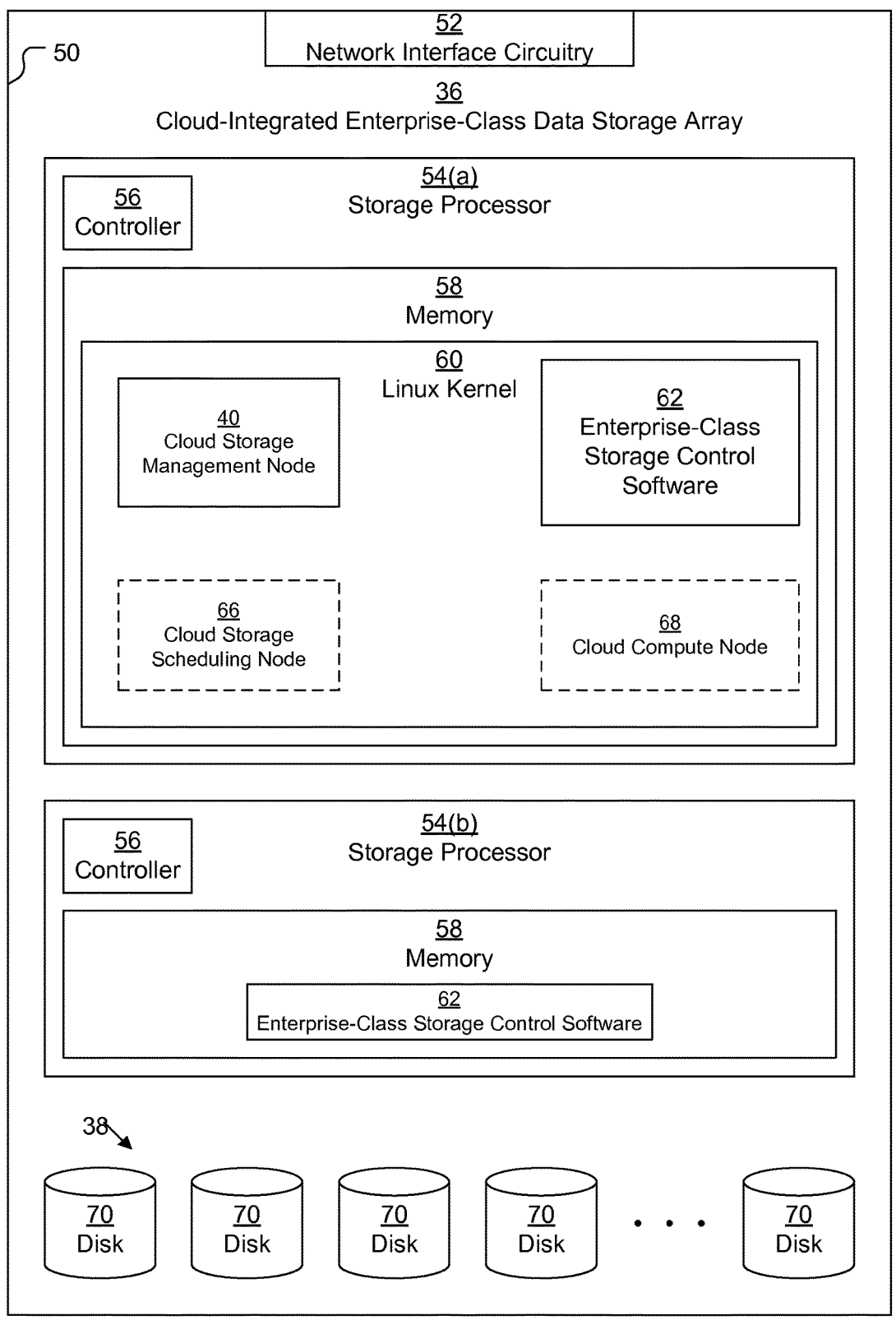
FIG. 2 depicts an example apparatus according to various embodiments.

FIG. 2 depicts an example cloud-integrated Enterprise-class data storage array 36. Cloud-integrated Enterprise-class data storage array 36 includes an enclosure 50 that includes therein network interface circuitry 52, a set of redundant storage processors 54, and Enterprise-class data storage 38. In addition, cloud-integrated Enterprise-class data storage array 36 includes (not depicted) a chassis and a set of cables and interconnects for connecting the various components together within enclosure 50.

Network interface circuitry 52 may include an Ethernet card, a fiber channel interface, a cellular modem, a Wireless Fidelity (WiFi) wireless networking adapter, any other device for connecting to network 32, or some combination thereof.

Storage processors 54 are described as being redundant because there are two of them arranged in a failover configuration, such that if one of them fails, the other one is capable of taking over for the failed one in all respects. Each storage processor 54 is typically a board mounted in the enclosure 50. Mounted on the board of each storage processor 54 is a controller 56 and memory 58.

Controller 56 may include any kind of processor or set of processors configured to perform operations, such as, for example, a microprocessor, a multi-core microprocessor, a digital signal processor, a system on a chip, a collection of electronic circuits, a similar kind of controller, or any combination of the above. In addition to processing capabilities, controller 56 also includes a redundant set of storage control interfaces for interfacing with disks 70 of the Enterprise-class storage 38.

Memory 58 may be any kind of digital system memory, such as, for example, random access memory (RAM). Memory 40 stores an operating system (OS) program (e.g., Linux, UNIX, Windows, or a similar operating system) and applications executing on processor 56 as well as data used by those programs. Applications, when stored in non-transitory form in memory 58 or on a persistent form of storage, form a computer program product. The controller 56 running one or more of these applications thus forms a specialized circuit constructed and arranged to carry out the various processes described herein.

In a typical arrangement, as depicted, the OS is the LINUX® OS. LINUX kernel 60 executes on controller 56 and is stored within memory 58. Enterprise-class storage control software 62, such as, for example, the Unisphere™ unified storage management software provided by the EMC Corp. of Hopkinton, Mass., also executes on controller 56 and is stored within memory 58. The Enterprise-class storage control software 62 is responsible for providing block-based and file-based access to the disks 70 and for allocating and partitioning partitions, as well as for managing RAID and other storage services, such as encryption and caching. The Enterprise-class storage control software 62 may also be responsible for establishing and maintaining one or more storage pools (not depicted). Typically each storage pool includes a mutually-exclusive subset of the disks 70 in such a way that volumes can be allocated up to the concatenated capacity of the subset, with disks 70 having similar performance and/or interface characteristics tending to be lumped together.

The Linux kernel 60 on at least one of the storage processors 54(*a*) also executes cloud storage management node 40 (e.g., OpenStack Cinder Volume Manager), which performs cloud-based storage management functions in communication with the Enterprise-class storage control software 62 for setting up virtualized logical disks for use by particular compute VMs 37. In some embodiments, there is a separate cloud storage management node 40 assigned to each storage pool of the Enterprise-class storage 38 from which virtualized storage is to be made available.

In some embodiments, one of the storage processors 54(*a*) also operates as a cloud storage scheduling node 66 (e.g., OpenStack Cinder scheduler), which receives requests from nodes 35 that desire virtualized storage and, in a scheduled manner, assigns each request to a particular storage pool. Upon being assigned to a storage pool, the cloud storage scheduling node 66 request can forward the request to the respective cloud storage management node 40 for the assigned storage pool. In other embodiments, the cloud storage scheduling node 66 may run off the Cloud-integrated Enterprise-class data storage array 36 in a COTS server 34, such as, for example, on COTS server 34(*a*) as part of control node 35(1).

In some embodiments, one of the storage processors 54(*a*) also executes other nodes of the DVCE 30 not running on a COTS server 34, such as for example, a cloud compute node 68. This cloud compute node 68 may run multiple KVMs to permit several compute VMs (not depicted) to execute.

Because the Cloud-integrated Enterprise-class data storage array 36 is designed to run Linux, it is efficient and straightforward to implement the various OpenStack nodes 40, 66, 68 to run on the Cloud-integrated Enterprise-class data storage array 36, since OpenStack was designed to run on Linux.

FIG. 3 depicts an example method 100 performed by a storage processor 54 of cloud-integrated Enterprise-class data storage array 36 for running a cloud storage management node 40 directly within the cloud-integrated Enterprise-class data storage array 36. It should be understood that any time a piece of software, such as, for example, cloud storage management node 40, Linux kernel 60, cloud storage scheduling node 66, or Enterprise-class storage control software 62, is described as performing a method, process, step, or function, in actuality what is meant is that a computing device (e.g., storage processor 54(*a*)) on which that piece of software is running performs the method, process, step, or function when executing that piece of software on its controller (e.g., controller 56).

In step 110, the storage processor 54 operates as cloud storage management node 40 of the DVCE 30 to assign a logical disk to a virtual machine (e.g., compute VM 37(1)) of the DVCE 30, the logical disk including storage from a set of storage drives 70 of the Enterprise-class data storage array 36. Further detail with respect to the operation of step 110 is provided below.

In step 120, after the storage processor 54 has assigned the logical disk to a virtual machine, the storage processor 54, through execution of Enterprise-class storage control software 62, processes data storage operations directed at the set of storage devices 70 in fulfillment of operations directed at the newly-assigned virtual disk by the compute VM 37(1) to which it was assigned in a highly-available and deterministic manner. It should be understood that the storage processor 54 may also process data storage operations directed at the set of storage devices 70 in a highly-available and deterministic manner before step 110 and during execution of step 110, but, logically, step 120 follows step 110 in the case of operations directed at a particular logical disk.

Returning to step 110 in more detail, the step may be performed in several sub-steps 112-116. In sub-step 112, cloud storage management node 40 receives a request from a storage scheduling node (e.g., cloud storage scheduling node 66 or another cloud storage scheduling node operating as a node 35 on one of the COTS servers 34) of the DVCE 30 to allocate a virtual disk to a particular VM (e.g., compute VM 37(1)) of the DVCE 30 from the set 38 of storage drives 70. For example, cloud storage scheduling node 66 may decide that compute node 32(2) should be allocated storage space from a premium storage pool having high speed disks, available on the cloud-integrated Enterprise-class data storage array 36, in which case storage scheduling node 66 would schedule the request to be sent to the particular cloud storage management node 40 that is responsible for the cloud-integrated Enterprise-class data storage array 36.

In sub-step 114, in response to the request from the storage scheduling node, cloud storage management node 40 requests allocation of a partition from the set 38 of storage drives 70. Cloud storage management node 40 will typically do this by sending a request to Enterprise-class storage control software 62.

In sub-step 116, upon Enterprise-class storage control software 62 returning a notification of the allocation of the requested partition to the cloud storage management node 40, the cloud storage management node 40 communicates with the particular VM (e.g., compute VM 37(1)) of the DVCE 30 (via the compute node 35(2) that runs it) to establish an assignment of the requested partition to that particular VM (e.g., 37(1)) of the DVCE 30 as the virtual disk assigned to that VM (e.g., compute VM 37(1)).

Thus, techniques have been described for placing an Enterprise-class data storage array 36 directly into a DVCE 30 and running a cloud storage management node 40 (as well as other optional cloud services, such as cloud storage scheduling node 62 and cloud compute node 68) directly within the Enterprise-class data storage array 36. Beneficially, this reduces latency in certain kinds of cloud storage management operations, such as virtual disk assignment, which allows cloud services to be instantiated more quickly.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as operating in accordance with OpenStack standards, that is by way of example only. Indeed, any node-based cloud computing infrastructure may be used, so long as the general structure of the system remains generally as described.

In addition, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A cloud-integrated enterprise-class data storage array device comprising:
    an enclosure;
    a set of storage drives mounted in the enclosure;
    network interface circuitry mounted in the enclosure, the network interface circuitry communicatively connecting the cloud-integrated enterprise-class data storage array device to a network to form a distributed virtualized computing environment; and
    a redundant set of storage processors mounted in the enclosure, the redundant set of storage processors being configured to:
        process, on the cloud-integrated enterprise-class data storage array device, data storage operations directed at the set of storage drives in a highly-available and deterministic manner; and
        operate the cloud-integrated enterprise-class data storage array device as a cloud storage management node of the distributed virtualized computing environment to manage assignment of logical disks to respective virtual machines (VMs) of the distributed virtualized computing environment, the logical disks including storage from the set of storage drives;
    wherein the redundant set of storage processors of the cloud-integrated enterprise-class data storage array device is configured to, when operating as the cloud storage management node:
        receive, at the cloud-integrated enterprise-class data storage array device, a request from a storage scheduling node of the distributed virtualized computing environment to allocate a virtual disk to a particular VM of the distributed virtualized computing environment from the set of storage drives;
        request allocation of a partition from the set of storage drives of the cloud-integrated enterprise-class data storage array device; and
        upon the cloud-integrated enterprise-class data storage array device receiving notice of allocation of the requested partition, communicate with the particular VM of the distributed virtualized computing environment to establish an assignment of the requested partition to the particular VM of the distributed virtualized computing environment as the virtual disk; and
    wherein the particular VM of the distributed virtualized computing environment operates within a compute node on a remote server of the distributed virtualized computing environment, the redundant set of storage processors being configured to communicate with the particular VM via the network interface circuitry over the network when establishing the assignment of the requested partition to the particular VM of the distributed virtualized computing environment as the virtual disk.

2. The cloud-integrated enterprise-class data storage array device of claim 1 wherein the redundant set of storage processors is further configured to operate as the storage scheduling node of the distributed virtualized computing environment to schedule selection of particular storage pools for particular virtual disks to be drawn from.

3. The cloud-integrated enterprise-class data storage array device of claim 2 wherein:
    the storage scheduling node of the distributed virtualized computing operates on another remote server of the distributed virtualized computing environment, the request from the storage scheduling node being received via the network interface circuitry over the network.

4. The cloud-integrated enterprise-class data storage array of claim 2 wherein:
    the distributed virtualized computing environment is an OPENSTACK environment;
    the redundant set of storage processors operate a LINUX kernel; and
    the cloud storage management node is a CINDER Volume Manager operating on the LINUX kernel.

5. A method of operating an enterprise-class data storage array device in a distributed virtualized computing environment, the method comprising operating a redundant set of storage processors of the enterprise-class data storage array device to:
    execute, on the enterprise-class data storage array device, a cloud storage management node of the distributed virtualized computing environment to assign a logical disk to a virtual machine (VM) of the distributed virtualized computing environment, the logical disk including storage from a set of storage drives of the enterprise-class data storage array device; and
    at the enterprise-class data storage array device, process, from the set of storage drives of the enterprise-class data storage array device in a highly-available and deterministic manner, data storage operations directed at the logical disk; wherein executing the cloud storage management node on the enterprise-class data storage array device includes:
    receiving, at the enterprise-class data storage array device, a request from a storage scheduling node of the distributed virtualized computing environment to allocate a virtual disk to a particular VM of the distributed virtualized computing environment from the set of storage drives of the enterprise-class data storage array device;
    requesting allocation of a partition from the set of storage drives of the enterprise-class data storage array device; and
    upon the enterprise-class data storage array device receiving notice of allocation of the requested partition, communicating with the particular VM of the distributed virtualized computing environment to establish an assignment of the requested partition to the particular VM of the distributed virtualized computing environment as the virtual disk; and wherein the particular VM of the distributed virtualized computing environment operates within a compute node on a remote server of the distributed virtualized computing environment, the redundant set of storage processors being configured to communicate with the particular VM via network interface circuitry over a network when establishing the assignment of the requested partition to the particular VM of the distributed virtualized computing environment as the virtual disk.

6. The method of claim 5 wherein:
the distributed virtualized computing environment is an OPENSTACK environment;
the redundant set of storage processors operate a LINUX kernel; and
the cloud storage management node is a CINDER Volume Manager operating on the LINUX kernel.

7. A computer program product comprising a non-transitory computer-readable storage medium storing a set of instructions, which, when executed by a redundantly-provisioned storage processor of an enterprise-class data storage array device, causes the enterprise-class data storage array device to:
at the enterprise-class data storage array device, process data storage operations directed at a set of storage drives of the enterprise-class data storage array device in a highly-available and deterministic manner; and
operate the enterprise-class data storage array device as a cloud storage management node of a distributed virtualized computing environment to manage assignment of logical disks to respective virtual machines (VMs) of the distributed virtualized computing environment, the logical disks including storage from the set of storage drives of the enterprise-class data storage array device;
wherein the instructions, when executed by the redundantly-provisioned storage processor, cause the enterprise-class data storage array device to, while operating the cloud storage management node:
receive, at the enterprise-class data storage array device, a request from a storage scheduling node of the distributed virtualized computing environment to allocate a virtual disk to a particular VM of the distributed virtualized computing environment from the set of storage drives of the enterprise-class data storage array device;
request allocation of a partition from the set of storage drives of the enterprise-class data storage array device; and
upon the enterprise-class data storage array device receiving notice of allocation of the requested partition, communicate with the particular VM of the distributed virtualized computing environment to establish an assignment of the requested partition to the particular VM of the distributed virtualized computing environment as the virtual disk; and wherein the particular VM of the distributed virtualized computing environment operates within a compute node on a remote server of the distributed virtualized computing environment, the redundantly-provisioned storage processor being configured to communicate with the particular VM via network interface circuitry over a network when establishing the assignment of the requested partition to the particular VM of the distributed virtualized computing environment as the virtual disk.

8. The computer program product of claim 7 wherein the instructions, when executed by the redundantly-provisioned storage processor, further cause the enterprise-class data storage array device to operate the storage scheduling node of the distributed virtualized computing environment to schedule selection of particular storage pools for particular virtual disks to be drawn from.

9. The computer program product of claim 7 wherein: the storage scheduling node of the distributed virtualized computing environment operates on another remote server of the distributed virtualized computing environment, the request from the storage scheduling node being received via the network interface circuitry over the network.

10. The computer program product of claim 7 wherein:
the distributed virtualized computing environment is an OPENSTACK environment;
the redundantly-provisioned storage processor operates a LINUX kernel; and
the cloud storage management node is a CINDER Volume Manager operating on the LINUX kernel.

* * * * *